United States Patent [19]

Jeddeloh et al.

[11] Patent Number: 5,414,857
[45] Date of Patent: May 9, 1995

[54] ADAPTIVE PROCESSOR INTERFACE OPERABLE WITH DIFFERENT TYPES OF PROCESSORS

[75] Inventors: Joseph M. Jeddeloh, Minneapolis; Joseph H. Meyer, Lino Lakes, both of Minn.

[73] Assignee: AST Rsearch, Inc., Irvine, Calif.

[21] Appl. No.: 955,474

[22] Filed: Oct. 2, 1992

[51] Int. Cl.⁶ .................. G06F 13/14; G06F 13/16; G06F 13/.20
[52] U.S. Cl. .................. 395/725; 395/325; 364/228; 364/259.9; 364/238.3; 364/238.4; 364/240; 364/239; 364/DIG. 1
[58] Field of Search .......... 395/200, 275, 800, 500, 395/725, 425, 325, 800; 371/11.3

[56] References Cited

U.S. PATENT DOCUMENTS

| | | | |
|---|---|---|---|
| 4,314,355 | 2/1982 | Leighou, Jr. et al. | 395/425 |
| 4,589,063 | 5/1986 | Shah et al. | 364/200 |
| 4,589,085 | 5/1986 | Pierce | 364/754 |
| 4,615,017 | 9/1986 | Finlay et al. | 364/900 |
| 4,727,477 | 2/1988 | Gavril | 364/200 |
| 4,866,664 | 9/1989 | Burkhardt | 395/200 |
| 4,879,720 | 11/1989 | Shumate et al. | 371/43 |
| 4,899,306 | 2/1990 | Greer | 395/500 |
| 4,964,038 | 10/1990 | Louis et al. | 364/200 |
| 4,991,085 | 2/1991 | Pleva et al. | 364/200 |
| 5,113,497 | 5/1992 | Dewa | 395/275 |
| 5,230,003 | 7/1993 | Dent et al. | 371/43 |

Primary Examiner—Gopal C. Ray
Attorney, Agent, or Firm—Westman, Champlin & Kelly

[57] ABSTRACT

A system controller controls subsystems in a computer. The system controller is operable with a processor in a computer. The system controller includes a plurality of decoders, each of the decoders being operable with a different processor type and being selectively activated so that the system controller can operate with a plurality of processor types. The decoders, when activated, receive processor request signals from the processor and decode the processor request signals to provide subsystem controller request signals. A controller receives the subsystem controller request signals and controls the subsystems based on the subsystem controller request signals.

32 Claims, 2 Drawing Sheets

ADAPTIVE PROCESSOR INTERFACE OPERABLE WITH DIFFERENT TYPES OF PROCESSORS

The following specifications are hereby incorporated by reference. A document provided by the Intel Corporation of Phoenix, Ariz., entitled *Microprocessors Volume 1*, published in 1992;

a publication entitled LR3000A *Processor Interface* published by LSI Logic;

a publication entitled *MIPS RISC Architecture*, provided by Mips Computer Systems, Inc. published in 1988;

a document entitled *IBM Hardware Technical Reference Micro Channel Architecture* provided by International Business Machines of Armonk, N.Y.;

the specification entitled AZ9032 *Memory/Bus Controller* provided by Micral, Inc. of Minneapolis, Minn.; and the specification entitled 486+*Slik-based PS/2 Compatible System* by Micral, Inc. of Minneapolis, Minn.

BACKGROUND OF THE INVENTION

The present invention relates to an interface between a processor and other subsystems in a computer system. More particularly, the present invention relates to an adaptive processor interface which is operable with a number of different types of processors, depending on a select input to the interface.

A computer system typically includes a microprocessor and a number of subsystems. Examples of subsystems used in a computer system include a memory subsystem and an input/output (I/O) bus subsystem. The memory subsystem commonly includes a block of dynamic random access memory (DRAM). The block of DRAMs stores a wide variety of information used to support the computer system.

The I/O bus subsystem includes an I/O bus which provides the processor with access to other devices external to the computer system such as memory devices, slave-type devices, or other processors. One typical I/O bus is the Micro Channel bus manufactured by International Business Machines Corp. of Armonk, N.Y.

In addition to the memory subsystem and the I/O bus subsystem, a computer system also typically includes some type of processor interface between the microprocessor and the subsystems. The interface provides communication between the processor and the various subsystems in the computer system. In the case of a computer system having a memory subsystem and an I/O bus subsystem, the interface provides communication between the processor and the I/O bus, as well as between the processor and memory devices in the memory subsystem.

Such interfaces typically include bus controller circuitry for acquiring control of the I/O bus, and for providing timing control between the I/O bus and the processor. The bus controller circuitry receives processor request signals from the processor such as command signals, address signals and data signals which represent a requested I/O bus operation. The bus controller circuitry then controls the I/O bus in accordance with those processor request signals to accomplish the requested operation.

The interface also typically includes a memory controller which provides timing control between the processor and the memory devices. The memory controller receives processor request signals, such as command signals, address signals and data signals from the processor which represent a requested memory operation. The memory controller then controls the memory devices based on those processor request signals to accomplish the requested operation.

For the sake of the present disclosure, the term "processor request signal" or "processor request signals" includes information which is provided by the processor to request a desired operation. A processor request signal can go by different names in the industry, depending on the different processor type being used. For example, when using an Intel 80486 processor, processor request signals preferably include the Address Strobe Signal (ADS) which marks a point in time when a request is being made by the 486 processor. The processor request signals also include the Status signals which define a type of operation which is being requested. Such signals include the Memory-I/O signal, the Read/Write signal, the Data/Code signal and other such signals. The processor request signals also include address signals which identify the location where the requested operation is to take place. Further, the processor request signals include Byte Enable signals which identify the specific byte on which the system is to operate. All of these types of signals, as well as any other signals provided by the 486 type processor to define or request an operation, are included as processor request signals.

In the past, processor interfaces for controlling subsystems were designed to interface the subsystems to one specific processor type. For example, the processor interface may typically be crafted around a specific Intel type processor having a 16 bit bus, or a specific Motorola type processor having a 16 bit bus. The processor interface would be designed to accept processor request signals unique to the specific processor type and decode those request signals into the desired memory request signals or I/O bus control signals to accomplish the requested operation.

However, such a processor interface requires those selling chip sets embodying the interface to qualify and stock a different chip set for each processor type. This results in those selling such chip sets to carry excess inventory which can be very costly. Further, those selling such chip sets must also qualify a large number of different types of chip sets. The qualification process can be very time consuming and costly as well. Both of these factors contribute to inefficiency which increases the cost of the chip sets to the ultimate consumer.

SUMMARY OF THE INVENTION

The present invention arises from the recognition that the processor interface (also referred to as a system controller) can be divided into essentially two components. The first component is a decode section, and the second component is a subsystem control section. The decode section receives processor request signals from the processor which represent a requested operation, decodes the processor request signals and provides them to the subsystem control section as subsystem controller request signals. The subsystem control section, in turn, controls the appropriate computer subsystem based on the subsystem controller request signals.

With the present invention, the interface includes a plurality of selectable decoders. Each of the decoders is operable with a different processor type and selectively activated so that the interface can operate with a plurality of processor types. The decoders, when activated, receive the processor request signals from the processor and decode the processor request signals to provide subsystem controller request signals. The subsystem control section receives the subsystem controller request signals and controls the subsystems based on the subsystem controller request signals.

In this way, the same chip set can be used to interface subsystems to a variety of processors. By simply selecting which of the decode sections is to be activated, the interface can be adapted for use with any of a number of processors. Hence, sellers of such interfaces need only stock and qualify one chip set for use with a variety of different processor types. This results in extensive savings in both time and money.

DETAILED DESCRIPTION OF THE PREFERRED EMBODIMENTS

Figure 1:
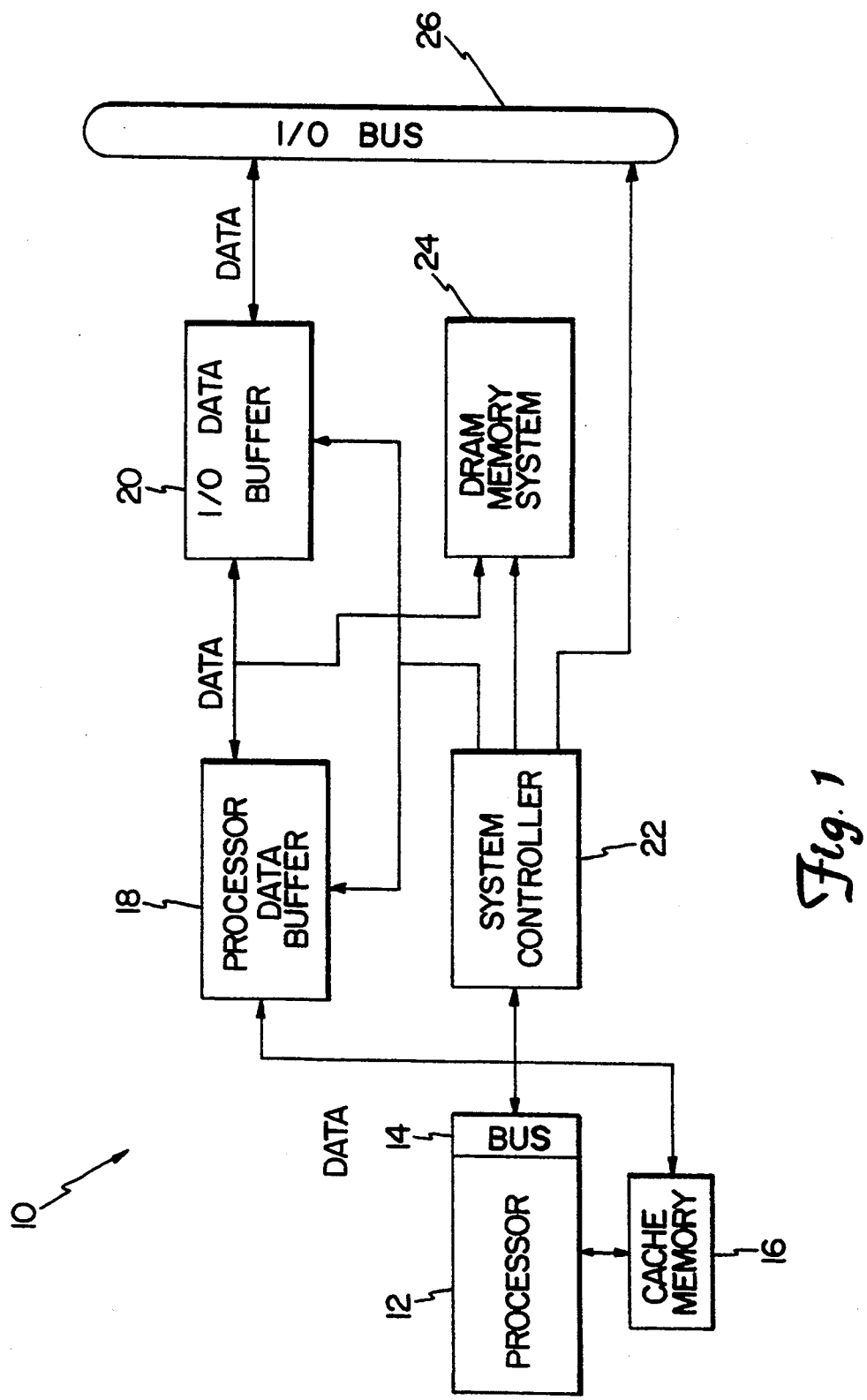
FIG. 1 is a block diagram of a portion of a computer system.

FIG. 1 is a block diagram of a portion of a computer system 10. Computer system 10 includes processor 12, processor bus 14, cache memory 16, processor data buffer 18, input/output (I/O) data buffer 20, system controller 22, DRAM memory system 24 and I/O bus 26. Processor 12 can be of any processor type. For the purposes of this disclosure, the term "processor type" refers to the characteristics of one particular microprocessor. For example, an Intel processor having a 16 bit bus and an Intel processor having a 32 bit bus are of different processor types. Although both processors belong to the same family and generally have the same architecture (i.e., Intel), and although both processors have substantially the same instruction set, they are of different processor types because they have different bus widths.

Bus 14 is a processor bus which is generally integral with processor 12 and used by processor 12 to communicate with external devices. Bus 14 carries data, address information, and command and control signals to external devices.

Cache memory 16 is a high speed memory directly accessible by processor 12. The general operating principles of a cache memory are well known. However, the specific operating characteristics of cache memory 16 may change depending upon the processor type of processor 12 and the cache protocol used to operate cache memory 16.

Processor data buffer 18 and I/O data buffer 20 are typical data buffers used for receiving and temporarily storing data in computer system 10. Processor data buffer 18 temporarily stores data received from, and provided to, processor 12. Similarly, I/O data buffer 18 temporarily stores data which is received from, and provided to, I/O bus 26.

DRAM memory system 24 is a large portion of memory which can be embodied in any of a wide variety of ways. Preferably, however, DRAM memory system 24 includes 8 banks of 2 or 8 megabyte memory using 256K×4 and 1M×4 DRAMs supported in 36 bit standard SIMS. However, any number of other memory configurations can by utilized. DRAM memory system 24 is used in computer system 10 to store information for use in computer system 10.

I/O bus 26 is used to provide communication between processor 12 and other processors, or slave devices coupled to I/O bus 26. I/O bus 26 has specifications for timing and functional control which can be vastly different than, and therefore incompatible with, signals provided by processor 12. The specifications for I/O bus 26 are commonly set out in a written specification provided by the manufacturer or designer of I/O bus 26. For example, the Micro Channel bus manufactured by International Business Machines Corp. is defined in a document entitled IBM Technical Reference Micro Channel Architecture, which is incorporated by reference into the present application. Since I/O bus 26 is commonly incompatible with processor 12, system controller 22 is provided to facilitate communication between processor 12 and I/O bus 26.

System controller 22 includes a decode section and a number of subsystem controller sections (shown in greater detail in FIG. 2) and controls I/O bus 26 and DRAM memory system 24. System controller 22 receives processor request signals from processor 12 which represent a requested operation. System controller 22 decodes the request signals and uses the decoded request signals as subsystem controller request signals to control DRAM memory system 24 and I/O bus 26, as well as processor data buffer 18 and I/O data buffer 20, to perform the requested operation. System controller 22 also handles all handshaking, timing alignment, and other logical manipulation which is required for processor 12 to communicate with the subsystems in computer system 10.

Figure 2:
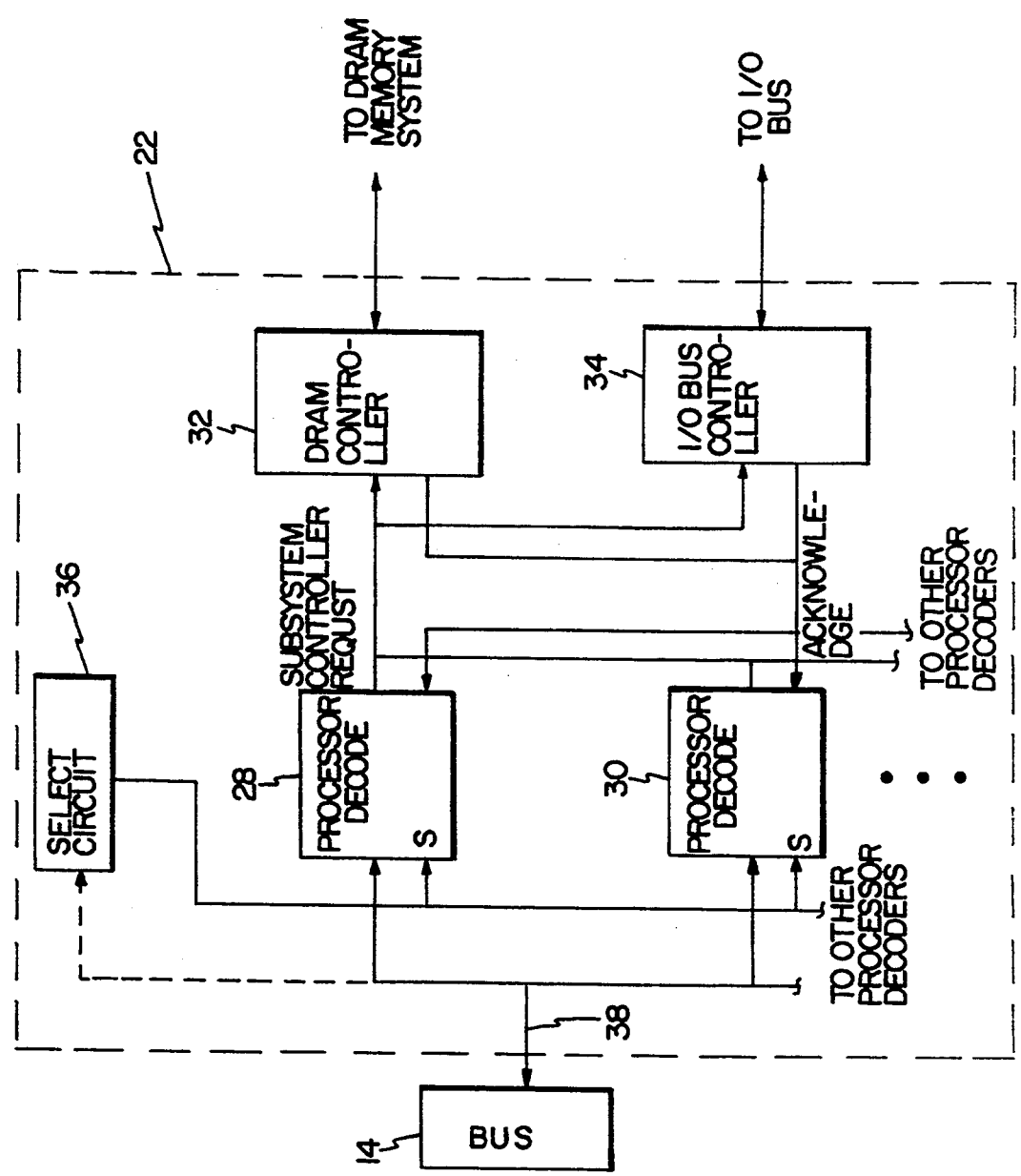
FIG. 2 is a more detailed block diagram of the system controller shown in FIG. 1.

FIG. 2 is a more detailed blocked diagram of system controller 22. System controller 22 includes processor decode sections 28 and 30, DRAM controller 32, I/O bus controller 34 and select circuit 36. It should be noted that there may be any number of processor decode sections and subsystem controller circuits. However, for the sake of simplicity, only processor decode sections 28 and 30 and controllers 32 and 34 are shown in FIG. 2.

In system controller 22, the subsystem controller functions are separated from the processor request decode functions. In other words, one of the processor decode sections 28 or 30 decodes the processor request signals provided by processor 12 via processor bus 14. The decoded processor request signals form subsystem controller request signals which are provided to the subsystem controllers (in this preferred embodiment DRAM controller 32 and I/O bus controller 34) which, in turn, control the respective subsystems.

In system controller 22, a plurality of processor decode sections are provided. Each processor decode section is designed to decode processor request signals provided by a specific processor type. For example, in this preferred embodiment, processor decode section 28 is designed to decode processor request signals provided by an Intel 486 processor. Processor decode section 30, on the other hand, is designed to decode processor request signals provided by another processor type, such as the next generation Intel processor having a 64 bit bus, or an entirely different family processor such as the MIPS R3000 processor.

Depending on what type of processor is used in computer system 10 as processor 12, one of processor decode sections 28 or 30 is activated. Processor decode sections 28 and 30 are selectively activated by receiving an activation signal on a select input. Select circuit 36 provides a select signal to the processor decode sections. Select circuit 36 can simply be a hardwire or strapping mechanism which is configured by an operator to select the appropriate type of processor decode section. Select circuit 36 can also be a programmable register which is programmed by processor 12 to selectively activate the appropriate processor decode section so that system controller 22 is operable with processor 12.

The processor request signals from processor 12 are provided to system controller 22 on a single set of input pins represented by arrow 38. The processor decode section which is selected by select circuit 36 decodes the processor request signals into subsystem controller request signals. The subsystem controller request signals are provided to the subsystems (DRAM controller 32 and I/O bus controller 34) to control the subsystem controllers to perform the requested operation on the appropriate subsystem. Once the requested operation has been performed by the appropriate subsystem controller, that subsystem controller provides an acknowledge signal back to the selected processor decode section. Upon receiving the acknowledge signal, the selected processor decode section provides the necessary handshaking with processor 12 to terminate the requested operation.

For a requested operation, the subsystem controller request signals provided to the subsystem controllers 32 and 34 are the same regardless of the type of processor used as processor 12. The selected decode section accepts the processor request and decodes that request into the desired decoded request signals. For example, if the desired operation is a write to the DRAM memory, the subsystem controller request signals provided to DRAM controller 32 are the same regardless of the type of processor used as processor 12. The only thing that changes is the processor decode section that is activated.

If processor 12 is an Intel 80486 type processor, for example, and if processor decode section 28 is designed to decode the request signals provided by an Intel 80486 processor, then select circuit 36 is configured to activate processor decode section 28. Processor decode section 28 decodes the processor request signals, which are provided by the Intel 80486 processor and which represent a write operation to memory, into subsystem controller request signals. The subsystem controller request signals are provided to DRAM controller 32 so that DRAM controller 32 performs the requested write operation on the DRAM memory subsystem.

Similarly, if the type of processor used as processor 12 is a MIPS R3000 processor, and if processor decode section 30 is designed to decode request signals provided by a MIPS R3000 processor, then select circuit 36 is configured to select or activate processor decode section 30. Processor decode section 30 receives the processor request signals from the MIPS R3000 processor which represent a write operation to DRAM memory. Processor decode section 30 decodes those signals into subsystem controller request signals which are identical to those provided by processor decode section 28 when processor 12 was an Intel 80486 processor. The subsystem controller request signals are again provided to DRAM controller 32 so that DRAM controller 32 performs the requested write operation on the memory subsystem.

Since the subsystem controller request signals provided to controllers 32 and 34 are the same regardless of the type of processor, the circuitry in those controllers need not change at all no matter what type of processor system controller 22 is used with. This provides a great deal of versatility without a high degree of circuit duplication.

The selected processor decode section does not only decode processor request signals provided by the processor, but it also decodes the acknowledge signals provided by the subsystem controllers 32 and 34. For example, if processor 12 is an Intel 80486 processor, processor decode section 28 decodes the acknowledge signal from DRAM controller 32 to provide the handshaking with processor 12 required by an Intel 80486 processor to terminate the requested operation. Similarly, if processor 12 is a MIPS R3000 processor, processor decode section 30 receives the acknowledge signal from DRAM controller 32 and provides the necessary handshaking required by the MIPS R3000 processor to terminate the requested operation.

The actual circuitry provided in processor decode sections 28 and 30 varies depending on the processor types to be accommodated and the particular subsystem controller request signals desired. Typical processor request signals which must be received and decoded when processor 12 is an Intel 80486 type processor are referred to earlier in the specification. However, if it is desired that system controller 22 also accommodate the MIPS R3000 type processor, processor decode section 30 which corresponds to the MIPS R3000 type processor needs to decode the processor request signals differently than those decoded in processor decode section 28 which corresponds to the Intel 80486 type processor.

For example, the MIPS R3000 processor provides either a Read Request or a Write Request. The address is also provided with either type of request. The Byte Enables are different than those provided by the Intel 80486 type processor. With the Intel 80486 type processor, the Byte Enables identify the particular byte to be operated on. With the MIPS R3000 type processor, the Byte Enables indicate whether a single, double or triple byte, or a full word is to be accessed. In addition, the handshaking required by the two processors is different. The Intel 80486 type processor waits for a ready signal to be returned to the processor to indicate that the requested operation is completed. The MIPS R3000 type processor, on the other hand, monitors a busy signal and waits until the busy signal goes active to know that the requested operation is completed.

Also, there can be slight variations in the addressing schemes provided by different processors. A processor may be able to request eight words, or only four words. The lower order address manipulation required in such circumstances is also taken care of by the activated processor decode section in system controller 22.

Timing variations are also typical from processor type to processor type. The processor decode sections in system controller 22 accomodate variations in timing alignment which are required to perform requested operations. For example, the processor request signals previously mentioned may come at different times with different processor types. Also, the processor request signals provided by different processor types may mean different things, depending on the processor type being used. All of these variations are handled by the processor decode sections which are designed to decode processor request signals of a specified processor type.

It can be seen that the present invention can be utilized to accommodate not only processors of completely different architecture and design, but also processors which are very similar, yet slightly different. The example which has been illustrated thus far is a system controller 22 which has a processor decode section 28 that decodes processor request signals provided by an Intel 80486 processor, and a second processor decode section 30 which decodes processor request signals provided by a MIPS R3000 type processor. These two processors have completely different architectures and designs. However, system controller 22 can also contain a third processor decode section for decoding processor request signals provided by an Intel 80386 processor or the next generation of Intel processor. Since these processors are both Intel products, the architecture is very similar. Also, the processor deals with essentially the same instruction set. However, the size of the bus may be different (e.g. 16 bit, 32 bit or 64 bit). In that case, processor data buffer 18 includes enough storage to accommodate the size of the largest data path width. Also, when the processor is a 64 bit processor, the number of Byte Enables increases. Decoding of the increased Byte Enables is provided in the appropriate processor decode section.

In addition, while the instruction set may be very similar, there may be slight differences. The next generation Intel processor may require support for new architectural features such as a write-back cache protocol, rather then a write-through cache protocol. These two types of cache protocols require different handshaking between the processor and system logic. All of these differences are accommodated in the design of the processor decode section corresponding to the individual type of processors discussed.

It has been found that, by providing processor decode sections for a variety of processor types, the gate count for the processor decode sections is only on the order of two-three thousand gates. The gate count required for the subsystem controllers (e.g., DRAM controller 32 and I/O bus controller 34) is in the range of thirty thousand gates. Thus, if system controller 22 is fabricated on a single integrated circuit chip, the multiple decode sections on the circuit chip occupy less than ten percent of the entire gate count. Thus, there is minimal extra logic required to have an adaptable processor interface, such as system controller 22, which is operable to interface a variety of different types of processors with the other subsystems in the computer system.

A complete instruction set for the Intel 80386 type processor, the Intel 80486 type processor, and the MIPS R3000 type processor can be found in the specifications which are incorporated by reference in the specification. It should be noted that, while the present description was set forth referencing Intel 80386 and 80486 type processors, as well as the MIPS R3000 type processor, the present invention can be used with any type processor. Once the instruction set and processor request signal logic and timing definitions are known, the appropriate processor decoding circuitry can be utilized to decode the processor request signals from the desired processor so that the appropriate processor decode section controls the subsystem controllers to execute the requested operations. Further, upon receiving an acknowledge signal from the subsystem controllers, the decode section carries out the proper handshaking and termination sequence with the processor to indicate that the requested operation has been performed.

By making a single integrated circuit chip that is capable of interfacing any one of a number of processors with other subsystems in a computer system, simply through the use of programmable or hardwire selection, the present invention provides an efficient and versatile mechanism for use with such processors. The end product is an adaptive chip set which can be used with a wide variety of processors, thus lowering the qualification and stocking costs to sellers of such chip sets. This, in turn, lowers the eventual cost to the consumers who use such chip sets.

Although the present invention has been described with reference to preferred embodiments, workers skilled in the art will recognize that changes may be made in form and detail without departing from the spirit and scope of the invention.

What is claimed is:

1. A computer system, comprising:
   a processor being of a first processor type;
   memory means, coupled to the processor, for storing information;
   an input/output (I/O) bus, coupled to the processor and the memory means; and
   a system controller, coupled to the processor, the memory means and the I/O bus, the system controller comprising:
   a plurality of decode means, coupled to the processor, for receiving processor request signals from the processor and decoding the processor request signals to provide subsystem controller request signals, each decode means corresponding to a different processor type and being selectable for operation with the processor based on the first processor type;
   selection means, coupled to the plurality of decode means, for providing selection of one of the plurality of decode means for operation based on the first processor type; and
   control means, coupled to the decode means, for controlling the memory means and the I/O bus based on the subsystem controller request signals.

2. The computer system of claim 1 wherein the control means comprises:
   a memory controller, coupled to the decode means and the memory means, for controlling the memory means; and
   an I/O bus controller, coupled to the decode means and the I/O bus, for controlling the I/O bus.

3. The computer system of claim 1 wherein the system controller comprises:
   a set of input pins for receiving the processor request signals from the processor wherein the plurality of decode means are all coupled to the set of input pins.

4. The computer system of claim 1 wherein the system controller comprises:
   a single integrated circuit chip.

5. The computer system of claim 1 wherein the selection means comprises:
   hardwire selection means for selecting one of the plurality of decode means to operate with the processor.

6. The computer system of claim 1 wherein the selection means comprises:
   programmable selection means for programmably selecting one of the plurality of decode means to operate with the processor.

7. The computer system of claim 1 wherein the decode means comprise:

a first decode section for decoding processor request signals provided by a 32 bit processor; and a second decode section for decoding processor request signals provided by a 64 bit processor.

8. The computer system of claim 1 and further comprising:

a processor data buffer coupled between the processor and the memory means; and an I/O data buffer coupled between the processor data buffer and the I/O bus.

9. The computer system of claim 1 wherein the processor includes a cache memory, and wherein the decode means comprise:

a first decode section for decoding processor request signals from a processor type having a write-through cache protocol; and a second decode section for decoding processor request signals from a processor type having a write-back cache protocol.

10. The computer system of claim 1 wherein the control means and the decode means are coupled to communicate using a request/acknowledge protocol.

11. A system controller for controlling subsystems in a computer having a processor of a first processor type, the system controller comprising:

a plurality of selectable decode means for receiving processor request signals from the processor and for decoding the processor request signals to provide subsystem controller request signals, the selectable decode means each being operable with a corresponding different processor type to decode the processor request signals;

selection means coupled to the plurality of selectable decode means, for selecting one of the selectable decode means for operation with the processor depending on the first processor type; and control means, coupled to the selectable decode means, for receiving the subsystem controller request signals and for controlling the subsystems based on the subsystem controller request signals.

12. The system controller of claim 11 wherein the control means comprises:

a memory controller, coupled to the selectable decode means, for controlling a memory subsystem; and an I/O bus controller, coupled to the selectable decode means, for controlling an I/O bus.

13. The system controller of claim 11 and further comprising:

a set of input pins for receiving the processor request signals from the processor wherein the plurality of selectable decode means are all coupled to the set of input pins.

14. The system controller of claim 11 wherein the system controller comprises:

a single integrated circuit chip.

15. The system controller of claim 11 wherein the selection means comprises:

hardwire selection means, coupled to the plurality of selectable decode means, for selecting one of the plurality of selectable decode means to operate with the processor.

16. The system controller of claim 11 wherein the selection means comprises:

programmable selection means, coupled to the plurality of selectable decode means, for programmably selecting one of the plurality of selectable decode means to operate with the processor.

17. The system controller of claim 11 wherein the plurality of selectable decode means comprise:

a first decode section for decoding processor request signals provided by a 32 bit processor; and a second decode section for decoding processor request signals provided by a 64 bit processor.

18. The system controller of claim 11 wherein the processor includes a cache memory, and wherein the plurality of selectable decode means comprise:

a first decode section for decoding processor request signals from a processor type having a write-through cache protocol; and a second decode section for decoding processor request signals from a processor type having a write-back cache protocol.

19. The system controller of claim 11 wherein the control means and the plurality of selectable decode means are coupled to communicate using a request/acknowledge protocol.

20. A controller for controlling subsystems in a computer system and for being operable with a processor in the computer system, the controller comprising:

a plurality of decoders, each of the decoders being operable with a different processor type and being selectively activated so that the controller can operate with a plurality of processor types, the decoders, when activated, receiving processor request signals from the processor and decoding the processor request signals to provide subsystem controller request signals;

a selector for activating one of the plurality of decoders; and control means, coupled to the decoders, for receiving the subsystem controller request signals and for controlling the subsystems based on the subsystem controller request signals.

21. The controller of claim 20 wherein the computer system includes memory for storing information and an I/O bus, and wherein the control means comprises:

a memory controller, coupled to the plurality of decoders and the memory, for controlling the memory; and an I/O bus controller, coupled to the plurality of decoders and the I/O bus, for controlling the I/O bus.

22. The controller of claim 20 and further comprising:

a set of input pins for receiving the processor request signals from the processor wherein the plurality of decoders are all coupled to the set of input pins.

23. The controller of claim 20 wherein the controller comprises a single integrated circuit chip.

24. The controller of claim 20 wherein the selector comprises:

hardwire selection means for selecting one of the plurality of decoders to operate with the processor.

25. The controller of claim 20 wherein the selector comprises:

programmable selection means for programmably selecting one of the plurality of decoders to operate with the processor.

26. The controller of claim 20 wherein the plurality of decoders comprises:

a first decode section for decoding processor request signals provided by a 32 bit processor; and a second decode section for decoding processor request signals provided by a 64 bit processor.

27. The controller of claim 20 wherein the processor includes a cache memory, and wherein the plurality of decoders comprise:
- a first decode section for decoding processor request signals from a processor type having a write-through cache protocol; and
- a second decode section for decoding processor request signals from a processor type having a write-back cache protocol.

28. The controller of claim 20 wherein the control means and the plurality of decoders are coupled to communicate using a request/acknowledge protocol.

29. The controller of claim 20 wherein the activated decoder controls the control means, based on the subsystem controller request signals, to perform a desired operation.

30. The controller of claim 29 wherein the control means provides an acknowledge signal to the activated decoder when the requested operation has been completed.

31. The controller of claim 30 wherein the activated decoder provides the processor with termination signals, to terminate the requested operation, in response to receiving the acknowledge signal from the control means.

32. The controller of claim 20 wherein the activated decoder includes means for decoding the processor request signals from the processor both logically and temporarily to provide the subsystem controller request signals to the control means so that the control means performs a requested operation.

* * * * *

UNITED STATES PATENT AND TRADEMARK OFFICE
CERTIFICATE OF CORRECTION

PATENT NO. : 5,414,857
DATED : May 9, 1995
INVENTOR(S) : Jeddeloh et al.

It is certified that error appears in the above-indentified patent and that said Letters Patent is hereby corrected as shown below:

Column 8, line 53, delete "means" and insert --sections--.

Signed and Sealed this

Fifth Day of December, 1995

Attest:

BRUCE LEHMAN

Attesting Officer

Commissioner of Patents and Trademarks